US012577137B2

(12) United States Patent
Cote et al.

(10) Patent No.: US 12,577,137 B2
(45) Date of Patent: Mar. 17, 2026

(54) PROCESS FOR WATER TREATMENT USING IMMERSED GAS TRANSFER MEMBRANES

(71) Applicant: BL Technologies, Inc., Minnetonka, MN (US)

(72) Inventors: Pierre Lucien Cote, Dundas (CA); John David Ireland, Oakville (CA); Nicholas William H. Adams, Oakville (CA); Steven Kristian Pedersen, Burlington (CA)

(73) Assignee: BL TECHNOLOGIES, INC., Minnetonka, MN (US)

( * ) Notice: Subject to any disclaimer, the term of this patent is extended or adjusted under 35 U.S.C. 154(b) by 323 days.

(21) Appl. No.: 17/968,569

(22) Filed: Oct. 18, 2022

(65) Prior Publication Data
US 2023/0045679 A1 Feb. 9, 2023

Related U.S. Application Data

(62) Division of application No. 15/548,632, filed as application No. PCT/US2015/037649 on Jun. 25, 2015, now Pat. No. 11,505,483.

(51) Int. Cl.
*C02F 3/20* (2023.01)
*B01F 23/20* (2022.01)
(Continued)

(52) U.S. Cl.
CPC .............. *C02F 3/208* (2013.01); *B01F 23/20* (2022.01); *B01F 23/231244* (2022.01);
(Continued)

(58) Field of Classification Search
CPC ........ C02F 3/208; C02F 3/102; C02F 3/1273; C02F 3/2853; C02F 2103/06;
(Continued)

(56) References Cited

U.S. PATENT DOCUMENTS

| | | | |
|---|---|---|---|
| 6,471,869 B1 | 10/2002 | Yanou et al. | |
| 7,118,672 B2 | 10/2006 | Husain et al. | |

(Continued)

FOREIGN PATENT DOCUMENTS

| | | |
|---|---|---|
| CA | 2512759 A1 | 8/2004 |
| CN | 2710734 Y | 7/2005 |

(Continued)

OTHER PUBLICATIONS

Adams et al., "An Innovative Membrane-Aerated Biofilm Reactor MABR) for Low Energy Treatment of Municipal Sewage," Singapore International Waler Week, June (SIWW), Singapore, Jun. 1-5, 2014.

(Continued)

*Primary Examiner* — Hayden Brewster

(57) ABSTRACT
An apparatus has a plurality of gas transfer membranes. The apparatus floats in water with the membranes submerged in the water. To treat the water, a gas is supplied to the membranes and is transferred to a biofilm supported on the membranes or to the water. Gas is also used to supply mixing or membrane scouring bubbles to the water. The mixing or scouring bubbles can be provided by a cyclic aeration or other gas supply system, which optionally provides gas at a variable pressure to the membranes in parallel or series with an aerator. Condensates can be removed from the membranes, and exhaust gasses from the membranes can be monitored, optionally through one or more dedicated pipes.

8 Claims, 8 Drawing Sheets

(51) Int. Cl.
| | |
|---|---|
| *B01F 23/231* | (2022.01) |
| *C02F 3/10* | (2023.01) |
| *C02F 3/12* | (2023.01) |
| *C02F 3/28* | (2023.01) |
| *B01F 23/237* | (2022.01) |
| *B01F 101/00* | (2022.01) |
| *C02F 103/06* | (2006.01) |

(52) U.S. Cl.
CPC ...... *B01F 23/231264* (2022.01); *C02F 3/102* (2013.01); *C02F 3/1273* (2013.01); *C02F 3/2853* (2013.01); *B01D 2313/26* (2013.01); *B01D 2315/06* (2013.01); *B01D 2321/185* (2013.01); *B01F 23/23761* (2022.01); *B01F 23/237611* (2022.01); *B01F 2101/305* (2022.01); *C02F 2103/06* (2013.01); *C02F 2209/003* (2013.01); *C02F 2209/225* (2013.01); *Y02W 10/10* (2015.05)

(58) Field of Classification Search
CPC .......... C02F 2209/003; C02F 2209/225; C02F 3/1278; C02F 2203/006; B01F 23/20; B01F 23/231244; B01F 23/231264; B01F 23/23761; B01F 23/237611; B01F 2101/305; B01F 23/23115; B01D 2313/26; B01D 2315/06; B01D 2321/185; Y02W 10/10
USPC ...................................................... 210/615
See application file for complete search history.

(56) References Cited

U.S. PATENT DOCUMENTS

| | | | |
|---|---|---|---|
| 7,279,215 | B2 | 10/2007 | Hester et al. |
| 8,500,107 | B2 | 8/2013 | Magen et al. |
| 2002/0020666 | A1 | 2/2002 | Cote et al. |
| 2003/0150798 | A1 | 8/2003 | Cote et al. |
| 2004/0229343 | A1 | 11/2004 | Husain et al. |
| 2005/0054087 | A1 | 3/2005 | Cote et al. |
| 2005/0123727 | A1 | 6/2005 | Hester et al. |
| 2005/0126963 | A1* | 6/2005 | Phagoo .................. B01D 65/02 |
| | | | 210/195.3 |
| 2008/0017558 | A1* | 1/2008 | Pollock ................. C02F 3/1273 |
| | | | 210/90 |
| 2009/0034358 | A1 | 2/2009 | Brod et al. |
| 2010/0126929 | A1 | 5/2010 | Husain et al. |
| 2013/0161254 | A1 | 6/2013 | Husain et al. |
| 2014/0008280 | A1 | 1/2014 | Husain et al. |

FOREIGN PATENT DOCUMENTS

| | | | |
|---|---|---|---|
| CN | 1747903 | A | 3/2006 |
| CN | 1890016 | A | 1/2007 |
| CN | 102531153 | B | 6/2014 |
| CN | 103130319 | B | 6/2014 |
| CN | 103896453 | A | 7/2014 |
| CN | 104030455 | A | 9/2014 |
| EP | 1423338 | A2 | 6/2004 |
| JP | 2013132608 | A | 7/2013 |
| JP | 2014091070 | A | 5/2014 |
| WO | 0021890 | A1 | 4/2000 |
| WO | 2004071973 | A1 | 8/2004 |
| WO | 2006118817 | A1 | 11/2006 |
| WO | 2008130885 | A2 | 10/2008 |
| WO | 2014130043 | A1 | 8/2014 |
| WO | 2015142586 | A2 | 9/2015 |

OTHER PUBLICATIONS

Australian Patent Application No. AU20150399496, Office Action dated Jan. 5, 2021.

Australian Patent Application No. AU20150399496, Office Action dated Oct. 22, 2020.
Canadian Patent Application No. 2,975,890, Office Action dated Feb. 21, 2022.
Canadian Patent Application No. 2,975,890, Office Action dated Jun. 21, 2021.
Chinese Patent Application No., 201580078535.3, Office Action dated Jun. 18, 2020.
Chinese Patent Application No. 20158078535, Office Action dated Apr. 15, 2021.
Chinese Patent Application No. 20158078535, Office Action dated Oct. 11, 2021.
Cote et al., "A New Membrane-Aerated Biofilm Reactor or Low Energy Wastewater Treatment: Pilot Results," Paper submitted for presentation at WEFTEC 2015.
Entex Technologies., Webitat, [retrieved on Jan. 5, 2015]. Retrieved from the internet: [URL: http://www.entexinc.com/solutions/webitat/ ]. 2 pages.
European Patent Application No. 15738537.8, European Office Action dated May 19, 2022.
European Patent Application No. 15738537.8, Office Action dated Oct. 26, 2018.
Gulf Cooperation Council Patent Application No. 2016-31582, Office Action dated Sep. 20, 2018.
Gulf Cooperation CouncilPatent Application No. GC2016-31582, Examination Report dated Jun. 27, 2019.
Hamer et al., "Methanotrophy: From the Environment to Industry and Back," Chemical Engineering Journal, Jun. 2010, vol. 160 (2), pp. 391-397.
International Patent Application No. PCT/US2015/037649, International Preliminary Report on Patentability dated Jan. 4, 2018.
International Patent Application No. PCT/US2015/037649, International Search Report and Written Opinion dated Jul. 4, 2016.
Xu Yatong et al., Operation and Management of Wastewater Biological Treatment, 2nd edition, China Light Industry Press, Jan. 31, 2009, pp. 50-51.
Korean Patent Application No. 10-2017-7027345, Office Action dated May 13, 2022.
Korean Patent Application No. 10-2017-7027345, Office Action dated Nov. 22, 2021.
Korean Patent Application No. 10-2017-7027345, Office Action dated Oct. 4, 2022.
Korean Patent Application No. 10-2022-7032045, Office Action dated Oct. 28, 2022.
Li et al., "Oil-field Wastewater Treatment by Hybrid Membrane-aerated Biofilm Reactor (MABR) System," Chemical Engineering Journal, Mar. 2015, vol. 264, pp. 595-602.
Martin et al., "The Membrane Biofilm Reactor (MBfR) for Water and Wastewater Treatment: Principles, Applications, and Recent Developments," Bioresource Technology, Oct. 2012, vol. 122, pp. 83-94.
Mehrabi et al., "Establishing Mainstream Nitrite Shunt Process in Membrane Aerated Biofilm Reactors: Impact of Organic Carbon and Biofilm Scouring Intensity," Journal of Water Process Engineering, 2020, vol. 37, 8 pages.
Philippine Patent Application No. PH1/2017/501654, Office Action dated Jun. 24, 2020.
Shen Yaoliang et al., New Technology of Wastewater Biological Treatment: Theory and Application, 2nd edition, China Environmental Science Press, Mar. 31, 2006, pp. 333-334.
Su et al., "Optimal Design of the Tubular Microporous Membrane Aerator for Shear-sensitive Cell Cultures," Biotechnology Progress, 1992,8, pp. 19-24.
Syron et al., "Membrane-Aerated Biofilms for High Rate Biotreatment: Performance Appraisal, Engineering Principles, Scale-up, and Development Requirements," Environmental Science Technology, Mar. 2008, vol. 42 (6), pp. 1833-1844.
Taskan et al., "Simultaneous Oxidation of Ammonium and Tetracycline in a Membrane Aerated Biofilm Reactor," Science of the Total Environment, 2019, vol. 682, pp. 553-560.
U.S. Appl. No. 15/548,632, Final Office Action dated Jan. 6, 2022.
U.S. Appl. No. 15/548,632, Final Office Action dated Sep. 30, 2021.

(56) References Cited

OTHER PUBLICATIONS

U.S. Appl. No. 15/548,632, Non-Final Office Action dated Mar. 22, 2019.
U.S. Appl. No. 15/548,632, Non-Final Office Action dated Oct. 25, 2019.
U.S. Appl. No. 15/548,632, Notice of Allowance dated Oct. 26, 2022.
U.S. Appl. No. 15/548,632, Restriction Requirement dated Jan. 10, 2019.
U.S. Appl. No. 15/568,245, Notice of Allowance dated Jul. 18, 2022.
U.S. Appl. No. 15/548,632, Final Office Action dated Jul. 23, 2019.
U.S. Appl. No. 15/548,632, Final Office Action dated May 29, 2020.
U.S. Appl. No. 15/548,632, Non-Final Office Action dated Apr. 7, 2021.
Philippine Patent Application No. PH1/2017/501654 dated Feb. 1, 2024.
Philippine Patent Application No. PH1/2017/501654 dated Apr. 19, 2024.
Philippine Patent Application No. PH1/2017/501654 dated Jul. 9, 2024.
Korean Patent Application No. 1020237022515, Office Action dated Apr. 3, 2024.
Chinese Patent Application No. 201580078535.3, Office Action dated Feb. 1, 2024.
Chinese Patent Application No. 201580078535.3, Office Action dated Jun. 4, 2024.
Canadian Patent Application No. 2,975,890, Office Action dated Jun. 28, 2024.
Jefferson, B., et al., "Membrane bioreactors and their role in wastewater reuse", Water Science & Technology, 2000, vol. 41, No. 1, pp. 197-204. Have.
Canadian Patent Application No. 2,975,890, Office Action dated Feb. 1, 2023.
Canadian Patent Application No. 2,975,890, Office Action dated Jul. 13, 2023.
Philippine Patent Application No. PH1/2017/501654 dated Apr. 5, 2023.
Australian Patent Application No. 2021221862, Office Action dated Jun. 23, 2023.
Australian Patent Application No. 2021221862, Office Action dated Oct. 13, 2022.
Australian Patent Application No. 2023258415, Office Action dated Dec. 6, 2024.
Korean Patent Application No. 10-2023-7022515, Office Action dated Feb. 11, 2025.
Wei, Xin et al., "Mixed pharmaceutical wastewater treatment by integrated membrane-aeratedbiofilm reactor (MABR) system—A pilot-scale study", Bioresource Technology 122 (2012) 189-195.

* cited by examiner

PROCESS FOR WATER TREATMENT USING IMMERSED GAS TRANSFER MEMBRANES

CROSS-REFERENCE TO RELATED APPLICATIONS

This application is a divisional of U.S. application Ser. No. 15/548,632, filed Aug. 3, 2017, which is a National Stage Entry of International Application No. PCT/US2015/037649, filed Jun. 25, 2015. International Application No. PCT/US2015/037649 is incorporated by reference.

FIELD

This specification relates to a membrane biofilm device and reactor, and to processes for water treatment using a membrane-supported biofilm.

BACKGROUND

In a membrane biofilm reactor (MBfR) for water or wastewater treatment, a membrane is used to both support the growth of a biofilm on a wall of the membrane and to transport a gas to the biofilm through the wall of the membrane. Membrane biofilm reactors were reviewed by Martin and Nerenberg in "The membrane biofilm reactor (MBfR) for water and wastewater treatment: Principles, applications, and recent developments" (Bioresour. Technol. 2012). Membrane-aerated biofilm reactors (MABR) are a subset of MBfRs in which an oxygen containing gas is used. MABRs were reviewed by Syron and Casey in "Membrane-Aerated Biofilms for High Rate Biotreatment: Performance Appraisal, Engineering Principles, Scale-up, and Development Requirements" (Environmental Science and Technology, 42(6): 1833-1844, 2008).

MBfR technology has existed on a laboratory scale for several years, but it has not been widely commercialized or scaled-up. The ZeeLung™ MABR developed by GE Water & Process Technologies uses cords, each cord containing multiple fine hollow fiber membranes. The cords are packaged into modules and cassettes in a way that resembles the packaging of hollow fiber ultrafiltration membranes into ZeeWeed™ modules and cassettes. The cords are potted into upper and lower headers to form modules. The modules are mounted to a frame to form a cassette. The cassette can be mounted on the floor of a process tank. MBfR units of this type are described in International Publication Number WO 2014/130043 A1, published on Aug. 28, 2014, which is incorporated herein by reference.

SUMMARY OF THE INVENTION

This specification describes a process in which a membrane supported biofilm unit is maintained at a generally constant depth of submergence in water to be treated. The unit could be mechanically lifted or lowered, but in a preferred embodiment the unit floats in the water. The unit may move horizontally as it rises or falls, or not. Optionally, the unit may be mounted such that it can be moved between multiple positions in the tank in plan view, for example depending on loading conditions, biofilm maturity or health, or change of season.

An exemplary floating unit has a frame and one or more floats. The frame holds modules or other structures with membranes. The floats may be secured to the frame before the frame is placed in a tank. Alternatively, the floats may be provided as part of a raft that is placed in the tank first, with the frames added later. The frame extends downwards from the floats, preferably such that the membranes are completely submerged. The floats may widen above the waterline to increase their righting moment. The frame may be part of a cassette as described in International Publication Number WO 2014/130043 A1.

Various processes for providing gas to the unit are also described. Process gas for use by the biofilm can be provided above the static head pressure of the water at the lowest depth of submergence continuously. Alternatively, process gas may be provided at a lower pressure but with intermittent increases in pressure sufficient to cause gas to also flow to an aerator. Non-process gas, such as gas for mixing the tank or scouring the membranes, can be provided periodically for example by valves, by an accumulator, or by a pulsing aerator. In one embodiment, a valve set is configured to provide a higher flow rate to a series of aerators sequentially.

The unit may be attached to one or more conduits to remove water or exhaust gas from the unit. The water removed can be monitored to check for leaks in the unit, for example by comparing the amount of water removed over a period of time to the expected amount of condensation in that period of time. Exhaust gas can be analyzed, for example to determine the amount of oxygen in it. This can be used to measure or monitor an oxygen transfer rate for the unit.

Keeping the unit at a generally constant depth of submergence enables a desired process gas pressure relative to water pressure without having to monitor and compensate for changes in the depth of the water in the tank. For example, the process gas pressure can be kept higher than the water head by a fixed amount to minimize or prevent water or gas entry into the membranes. In another process, a single gas feed is attached to the membranes and to an aerator, preferably in parallel. Varying the applied gas pressure can provide process air only, process air and bubbles from the aerator for mixing, or process air and bubbles from the aerator for scouring. Non-process air can be provided intermittently, or sequentially between multiple units in a tank or other group of units, by a cyclic aeration system valve unit. A pressure reducing by pass around the valve unit can be provided such that each unit receives process air, or process air and mixing air, continuously at a lower rate.

In a hybrid MABR application for municipal wastewater treatment, membrane supported fixed-film biomass and suspended biomass are complementary. The fixed-film biomass is at least partially aerobic while the suspended biomass is at least partially anoxic or anaerobic. Floating membrane units as described herein may be added to an existing process tank in a wastewater treatment plant. For example, one or more units may be added to a tank, optionally with suspended biomass, to reduce aeration energy consumption, to increase capacity, or to reduce nitrogen concentration in the effluent.

Rigid anchoring of cassettes is standard for filtration membranes. However, MBfR units are more likely to be installed into existing plants. The ideal location for the units for the treatment process may have limited mounting points due to existing equipment or structures. In some cases, it may be desirable to add the units without stopping the plant. It may also be desirable to change the position of a unit to adapt to conditions that change over time. These factors can make it advantageous to provide a floating unit. A floating unit also locates the membranes at a generally fixed and predetermined depth of submergence regardless of the tank design or water level in the tank. In some processes, the generally constant depth of submergence assists in the operation of the membranes or aerators that are part of the unit. Providing a floating unit with its own aerators also helps when retrofitting the unit in a tank by removing the need to adapt the unit to mixing or aerating equipment already present in a plant.

DETAILED DESCRIPTION

Gas permeable membranes suitable for supporting the growth of a biofilm on their surface may be provided in various forms including flat-sheets and hollow fibers. One preferred structure is a "cord" as described in International Publication Number WO 2014/130043. The cord is made up of a plurality of filaments. Some of the filaments are hollow fiber gas transfer membranes. Other filaments are reinforcing filaments, or provided to space out the gas transfer membranes.

Figure 1A:
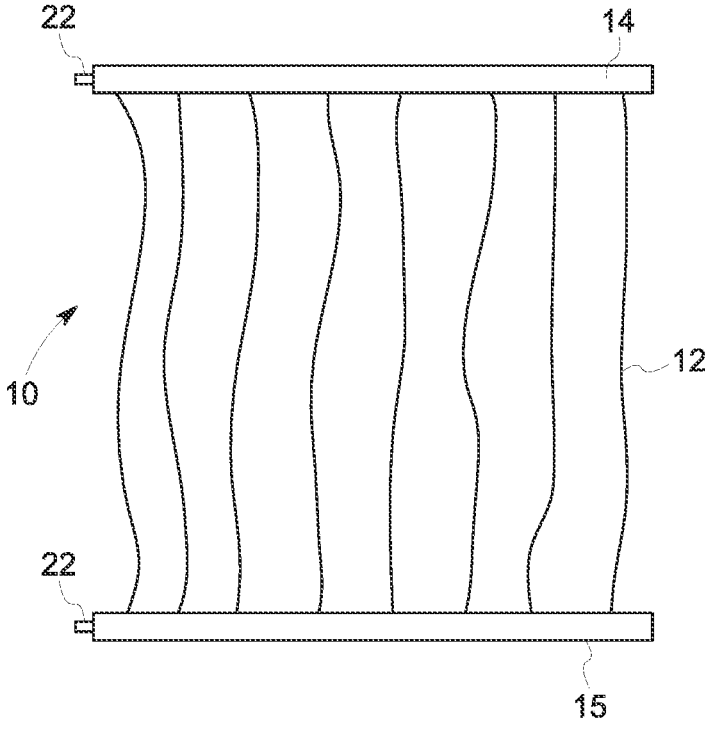
FIG. 1A is a drawing in side view of a membrane supported biofilm module.

FIG. 1A shows a module 10 having many cords 12 potted into upper headers 14 and lower headers 15. The ends of the gas transfer membranes within the cords 12 are open to a cavity within each header 14, 15 and communicate with a port 22 on each header. In use, the port 22 of the upper header 14 is typically attached to a gas supply line. The port 22 of the lower header 15 is typically used to exhaust gas from the module 10. The two headers are vertically aligned and held apart by a frame. Only a few cords 12 are shown to simplify the figure, but a module 10 may have tens, hundreds, or thousands of cords 12.

Figure 1B:
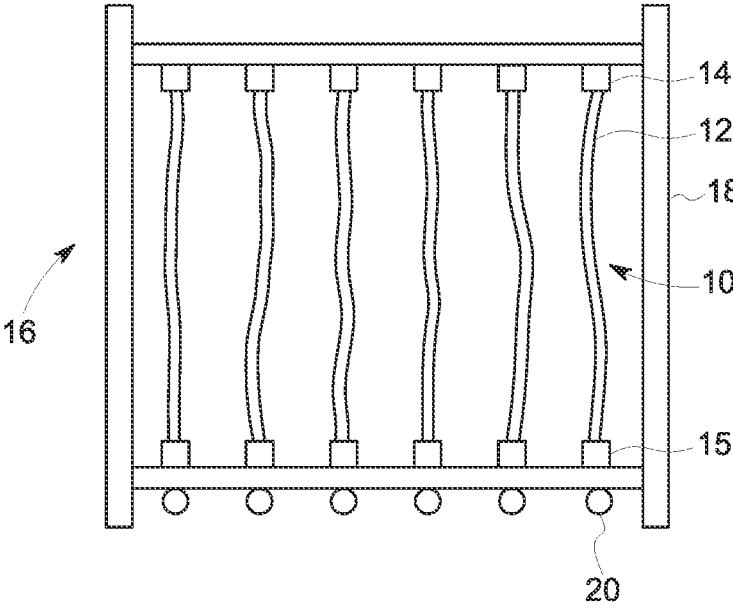
FIG. 1B is a drawing of a cassette including modules as in FIG. 1A with the modules shown in end view.

Referring to FIG. 1B, many modules 10 can be combined to form a cassette 16. In the example shown, the modules 10 are connected to a frame 18. The frame also holds a set of aerators 20 below the modules 10. The aerators 20 are made up of pipes that extend across the frame 18 and have air discharge holes along their length. The air discharge holes are not visible in the figure because the pipes are shown in end view. Typically, the upper headers 14 are connected to a common air supply header pipe, the lower headers 15 are connected to a common exhaust manifold pipe, and the aerators 20 are connected to a third common pipe. These common pipes are attached to the frame 18 or otherwise integrated into the cassette 16 such that the cassette 16 has three connection points for all of the modules 10.

Figure 2A:
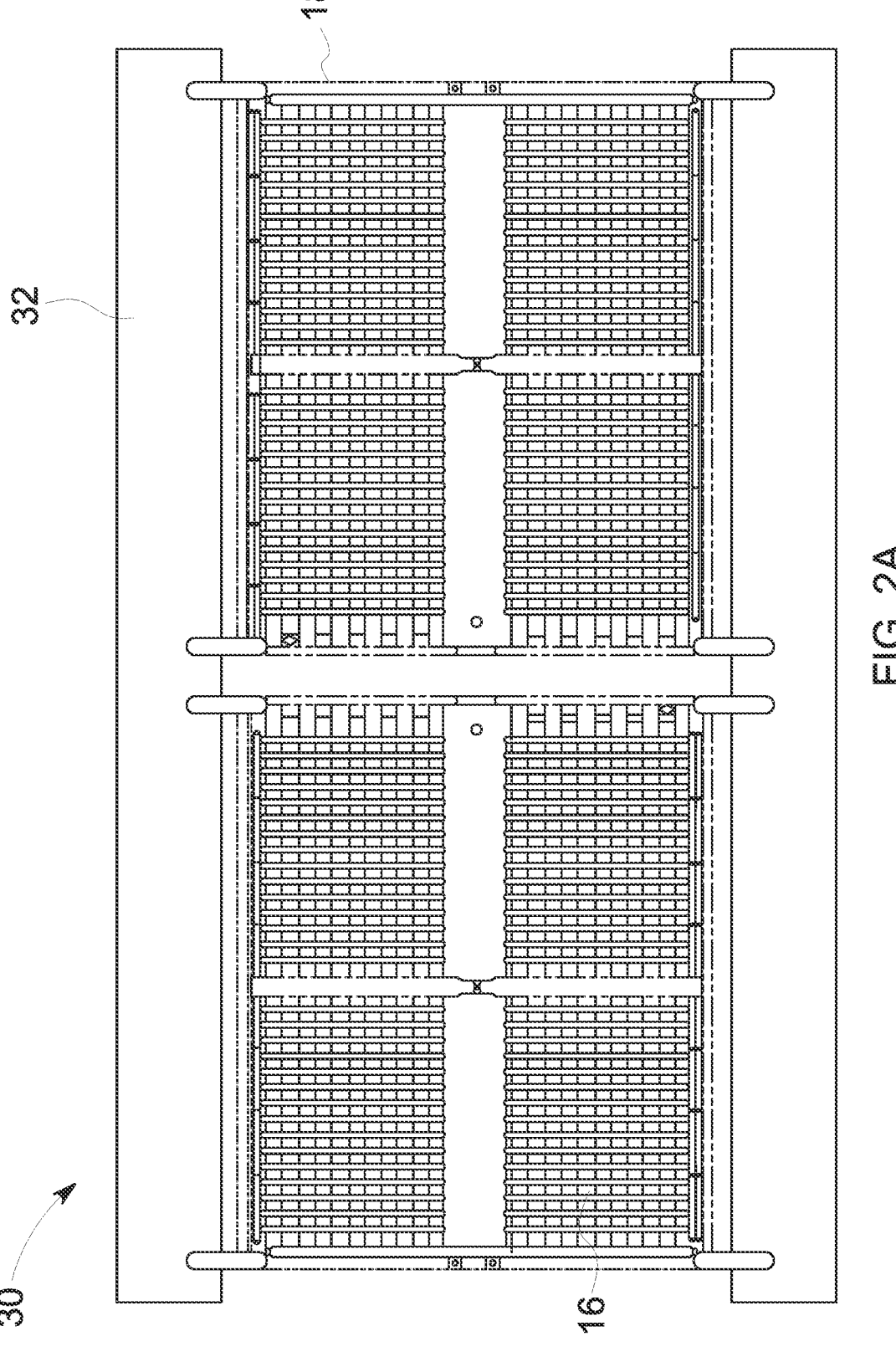
FIG. 2A is a top view of a floating membrane supported biofilm unit having two of the cassettes of FIG. 1B.
Figure 2B:
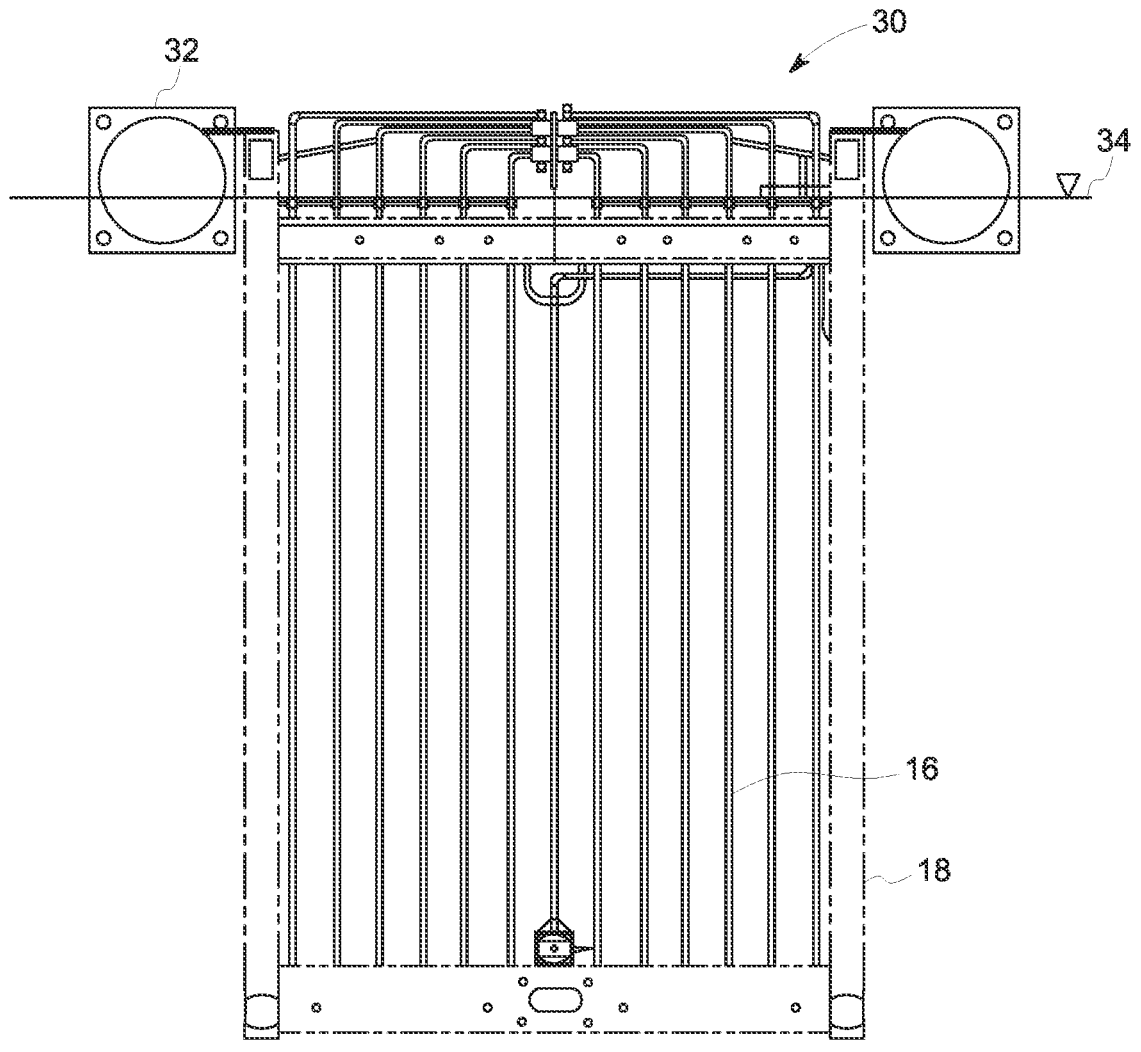
FIG. 2B is a side view of the unit of FIG. 2A.

FIGS. 2A and 2B show top and side views of a floating membrane supported biofilm unit 30. This unit 30 has two cassettes 16 attached by their frames 18 to two floats 32. The cassettes 16 extend downwards from the floats 32, preferably such that the cords will be below an expected waterline 34. In this example, the cassette frames 18 are attached to the floats 32 to make an integrated assembly. The unit 30 can be placed into a tank of water, for example by a crane. Alternatively, the floats 32 may be assembled into a raft adapted to receive the cassettes 16. The raft can be placed in water first, followed by lowered the cassettes into the raft. The cassettes 16 in the unit 30 may be ZeeLung™ cassettes available from GE Water & Process Technologies. These cassettes are 1,745 mm wide, 2,112 mm long and 2,540 mm high. Each cassette contains approximately 750 km of membrane cords, which can support about 3,500 m$^2$ of biofilm surface area. In a membrane aerated bioreactor (MABR), the cassette can be fed with atmospheric air at a flow rate of 8-15 Nm$^3$/h and can transfer about 40-50 kg O$_2$/d directly (i.e., without bubbles) to an attached biofilm. These cassettes 16 will also be used as the basis for calculations or detailed examples in the further description below.

In the unit 30 shown, each float 32 is a hollow tube with two sealed ends defining an airtight cavity. The floats 32 are made of stainless steel. The floats 32 are located on the sides of the cassettes 16. The unit 30 is approximately 5 m long and 2.6 m wide. The floats 32 are 400 mm in outside diameter and provide about 2,900 N of buoyancy each. The required buoyancy is determined based on the weight of the cassettes 16 but accounting for the buoyancy of the hollow fiber membranes, headers 14, 15 and other hollow parts of the cassettes 16. Dynamic forces exerted by bubbles rising from the aerators 20 should also be considered. In other alternatives, the floats 30 may be of other shapes, materials or structures that float. The floats 30 may be placed in other locations relative to the cassettes 30. There may be other numbers of cassettes 16 or floats.

The center of gravity of the cassettes 16 is below the expected waterline 34. The floats 32 preferably widen above the expected waterline 34. In the example shown, the expected waterline 34 is below the horizontal centerline of the cylindrical floats 32. In this way the righting moment of the unit 30 is increased to make the unit 30 more stable when subject to non-centered loads such as wind, obstructed aerators, or variations in airflow among the aerators 20.

Figure 2C:
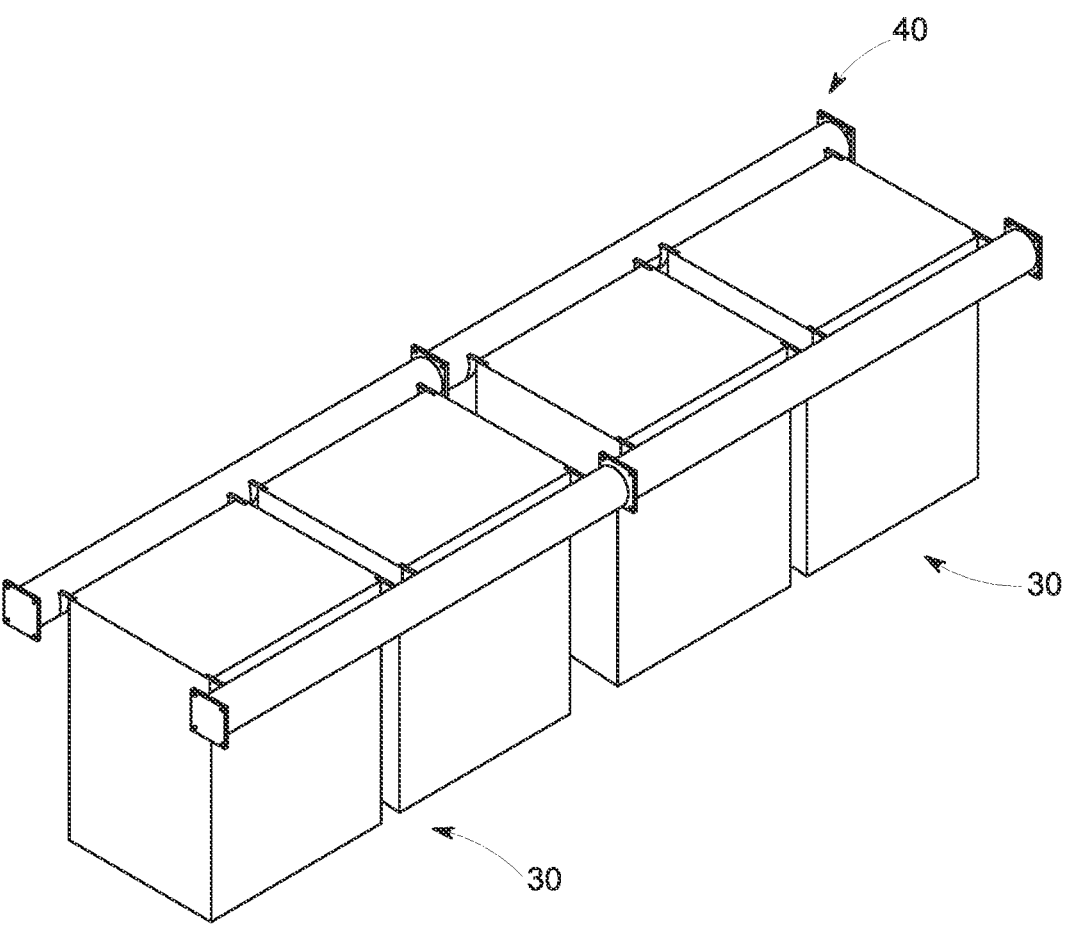
FIG. 2C is a schematic isometric drawing of a larger membrane supported biofilm unit made up of two of the units of FIG. 2A attached together.

FIG. 2C shows a larger unit 40 made by attaching two of the units 30 together end to end. Alternatively, cassettes 16 or units 30 may be attached together in other configurations. Although other sizes are possible, membrane supported biofilm units preferably have 1-8 cassettes 16, more preferably 2-4 cassettes 16. In the description that follows, references to any one of a unit 40, unit 30, cassette 16, or module 10 apply to the other configurations described above (unit 40, unit 30, cassette 16, or module 10) and to other membrane supported biofilm devices, modified for example by attaching floats 32 if necessary, unless stated otherwise or apparent from details in the reference.

Figure 3:
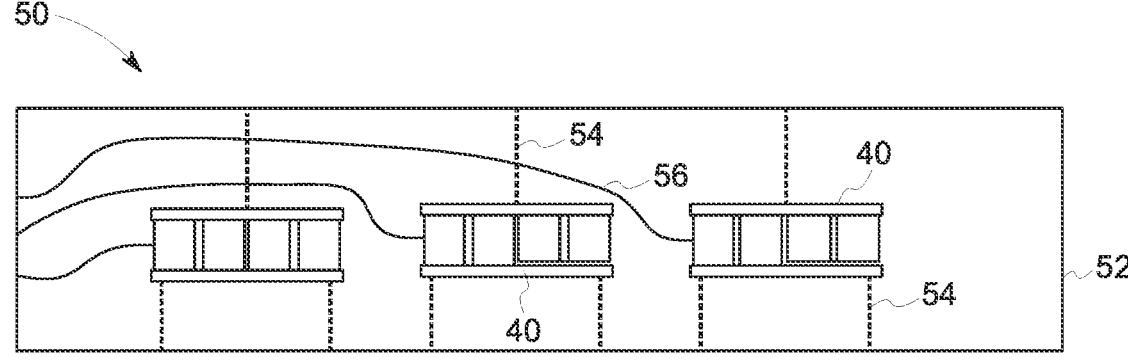
FIG. 3 is a schematic plan view of a membrane biofilm reactor (MBfR) having three of the larger units of FIG. 2C deployed in a tank.

FIG. 3 shows, from above, a reactor 50 with three of the larger units 40 floating in a tank 52. In use, water being treated, such as mixed liquor or wastewater, flows through the tank 52. The water in the tank 52 has a free surface. The tank 52 is typically an open tank with the free surface at ambient pressure. Optionally, the free surface may be slightly pressurized, for example by maintaining biogas under a cover over an anaerobic tank. The floats 32 may be placed in the tank 52 without the cassettes 16, typically by crane and preferably after attaching the floats 32 together to form a stable raft adapted to receive the cassettes 16 from above. The cassettes 16 are then lowered into the raft. Alternatively, the floats 32 can be attached to the cassettes 16 on shore and the completed unit 40 can be placed into the tank 52. The units 40 can be removed either as complete units 40 or by first lifting the cassettes 16 from the floats 32. The units 40 are preferably added to the tank 52 and removed from the tank 52 while the tank 52 has at least enough water to float the unit 40. Alternatively, frames 18 may be designed to support the cassettes 16, at least temporarily, on the ground in which case the unit 40 could be installed or removed while the tank 52 is empty.

After being lowered by cranes into the tank 52, each unit 40 is attached to tethers 54 to position the unit 40 in the tank 52. The other ends of the tethers 54 are attached, for example, to the sides of the tank 52 as shown or to a deck or the ground around the tank 52. The tethers 54 allow the units 40 to rise and fall in the tank 52 as the water level rises and falls in the tank 52. In this way, the immersion depths of the cords 12 and aerators 20 remain generally constant. Alternatively, the units 40 may be raised or lowered mechanically in response to changes in water level, but the floating units 40 provide this adjustment simply and automatically. Having the cords 12 and aerators 20 at a constant and predetermined depth of submergence helps enable some of the processes that will be described further below. However, the processes described herein may also be used or adapted for use with modules 10 fixed in place in a tank 52.

It is acceptable, but not preferred, for the units 40 to move horizontally to some extent as they rise and fall. The simplest tether 54 is a rigid cable provided with some excess length. In another alternative, the tether 54 is taut but includes a resilient member. For example, the tether 54 may have a section of rubber, coiled spring or other resilient material. In other alternatives, devices used to attach boats or other marine structures to docks or pilings may be adapted. For example, a tether 54 may include a bent whip or pole, a vertical rod that slides within a ring, or a spring biased lever. Since gas distribution to the cords 12 and aerators 20 improves when the unit 40 is level, it is preferable to use tethers 54 such that they tend to stabilize or level the unit 40.

A temporary walkway may be dropped into place across the walls of the tank 52 to facilitate hooking up one or more hoses 56 to the units 40. The hoses 56 are preferably flexible so that they move with the units 40. The hoses 56 may be connected to rigid pipes where they reach the ground or the walls of the tank 52. Since the hoses 56 primarily transport gasses, they typically float on the surface of the water in the tank 52 and do not need to be supported. One hose 56 is connected to each unit 40 in FIG. 3, and could be used to supply oxygen to a unit 40 operating in a dead end process or without collecting the exhaust gas. Alternatively, each unit 40 may have one or more other hoses 56, for example to supply mixing/scouring gas separately from process gas, to collect exhaust gas, for monitoring, or to remove condensate or other liquids.

When a unit 40 is used for water treatment, for example in a MABR, the membranes are typically provided with gas for transfer to the biofilm supported on the membranes and gas to produce bubbles outside of the membranes. The first gas may be called "process gas" and is pumped into the inside of the gas transfer membranes. Optionally, process gas that is not transferred to the biofilm may be removed from the inside of the membranes. Gas used to produce bubbles may be called non-process gas, mixing gas, scouring gas, or mixing/scouring gas. This gas is fed to an aerator 20, preferably below or near the bottom of the module 10. The process gas contains a component, such as oxygen, that supports a biochemical reaction in the biofilm. The non-process gas may contain the same component for convenience, but it is not required. In an MABR, air may be used for process gas and non-process gas. Optionally, module exhaust gas may be used as non-process gas. Non-process gas may be used to mix the water around a module 10 to promote transfer of aqueous reactants into the biofilm. Non-process gas can also be used, typically when provided at a higher rate than for mixing, to periodically scour the membranes to remove excess biofilm or to control the thickness of the biofilm.

A floating unit 40 can be used in a variety of membrane biofilm reactors. Depending on the type of a gas supplied into it, the unit 40 can be used for, among others, aerobic treatment of wastewater. In this case, the process gas is an oxygen-containing gas such as air. In another example, the unit 40 can be used for fully or partially anaerobic biochemical reactions where the process gas can be hydrogen, carbon monoxide, syngas or methane. For example, hydrogen containing process gas can be used to denitrify groundwater or to produce methane. Syngas or methane containing process gas can be used to produce ethanol. In this specification, references to "air" may be used for convenience but should be understood to include other gasses where appropriate.

In another alternative, a floating unit 40 can be used without process air to support a fixed biofilm. In this case, cords 12 may be provided without hollow fiber membranes, or the hollow fiber membranes can be used without supplying air to them, to support an anoxic or anaerobic biofilm. For example, a floating unit 40 may be added into a tank in a conventional activated sludge plant to provide an integrated fixed-film activated sludge (IFAS) reactor.

A floating unit 40 may be used in an essentially fixed film reactor such as an MABR where most of the active biomass in a tank 52 is fixed on the surface of the cords 12. Alternatively, a floating unit 40 may be used in a hybrid configuration where there is also biologically active suspended growth (planktonic biomass) in the tank. One application for a hybrid configuration is to add a floating unit 40 to a tank 52 in an existing activated sludge plant to enhance the removal of nitrogen.

Figure 4:
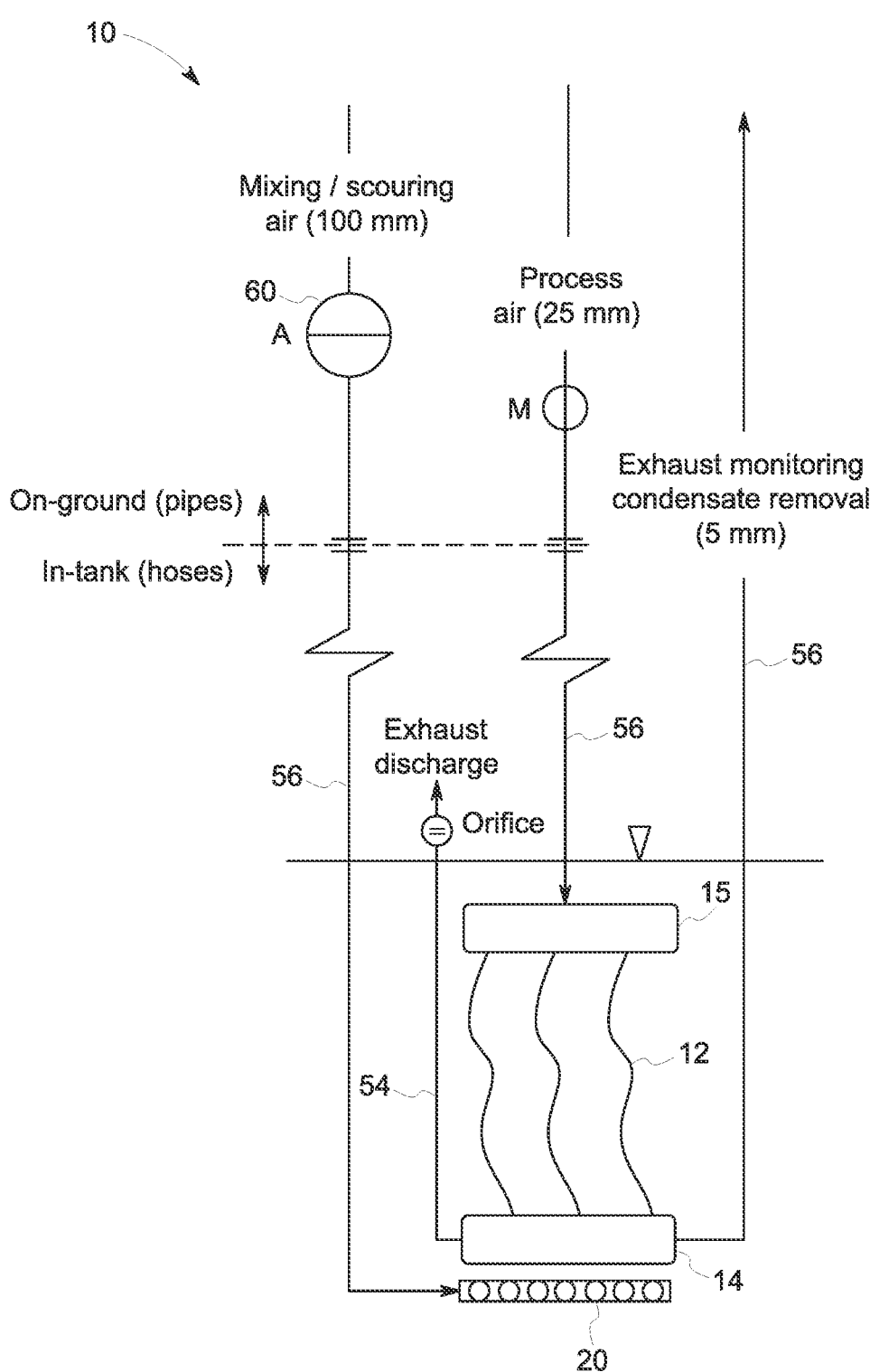
FIG. 4 shows a first example of piping connections to a membrane supported biofilm unit and aerator.

FIG. 4 shows a module 10 connected to various hoses 56. A single module 10 is shown to simplify the figure, but numerical parameters in the following description are for a floating unit 40 having four cassettes 16. One hose 56 is used for carrying a generally continuous flow of process air to the membranes in the module 10. This air enters through the upper header 15, flows down the lumens of the hollow fiber membranes in the cords 12, collects in lower header 14, and exhausts through a hose 56 that preferably extends back above the surface of the water. Flowing process gas from top to bottom helps carry any condensate or leakage water to the bottom header 14 where it can be removed as described further below. The flow rate of process air for a four-cassette unit 40 is 30-60 Nm³/h, with a target value of 40-50 Nm³/h. This can normally be handled in a 25 mm (1 inch) hose.

Figure 5:
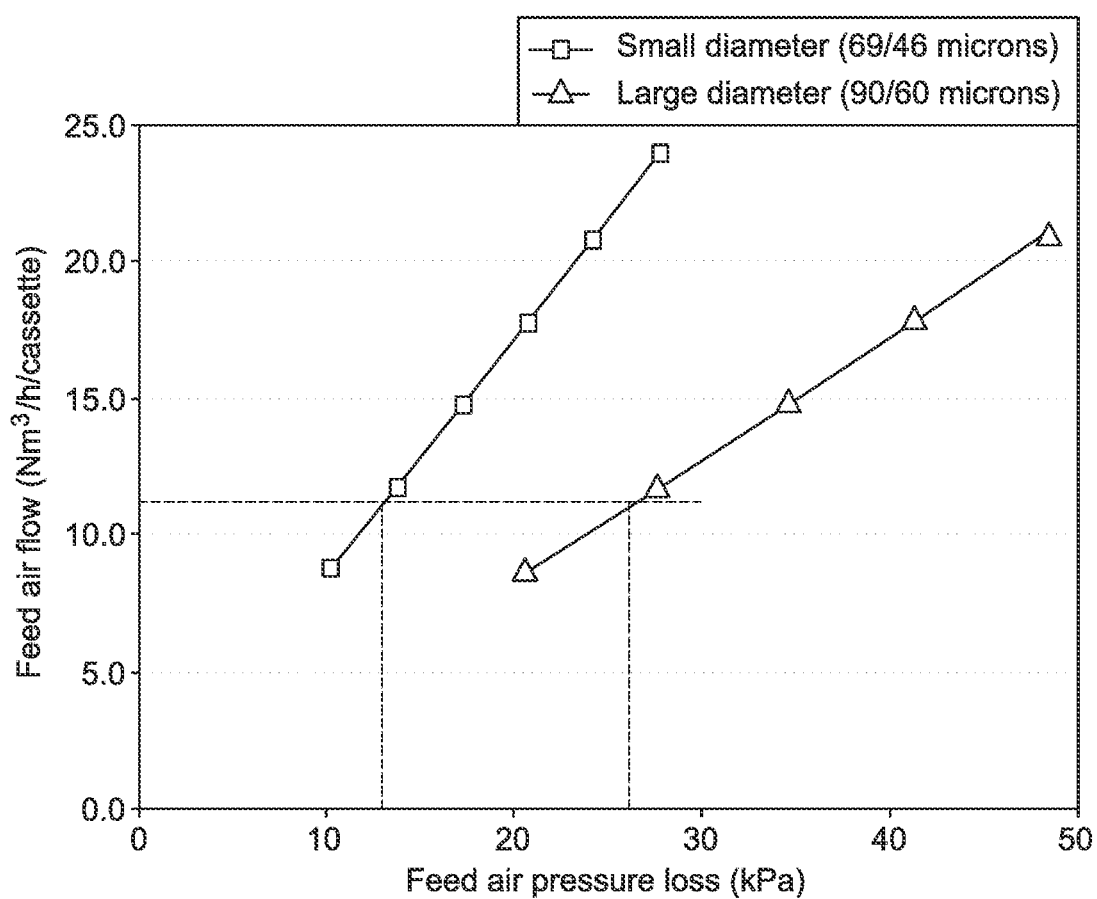
FIG. 5 is a graph showing the air flow and pressure losses through a membrane supported biofilm unit.

The process air in this example is supplied at a pressure that is the sum of all pressure losses between the blower and the discharge point. This is composed of i) membrane losses, ii) discharge pressure and iii) conduit losses. The relationship between air flow and membrane losses for two sample cassettes 16 with smaller and larger hollow fibers is presented in FIG. 5. At a target flow rate of 11 Nm³/h/cassette (i.e. 44 Nm³/h for a 4-cassette unit 40), the pressure loss through the cassette 16 is about 25 kPa for the small diameter hollow fiber.

The exhaust discharge pressure is a design choice. An increased exhaust discharge pressure can be provided using an orifice in the exhaust discharge hose 56. The increased pressure provides additional driving force for gas permeation and can also ensure that the pressure inside the membranes is higher than the water static pressure outside the membranes at the lowest submergence depth of the membranes. This prevents water from entering the membranes should there be a leak. For example, with the lowest part of a membrane submerged 2.4 m below the water surface, static head pressure is about 25 kPa. The exhaust discharge pressure, optionally reduced by pressure loss in the exhaust hose 56, may be equal to or more than this static head pressure. The composition of the exhaust air is a function of the transport conditions at the membrane surface and the activity of the biofilm. In general, the flow rate of exhaust gas is 80-95% of the feed flow rate and the exhaust gas is low in oxygen.

In the example of a four cassette unit 40, hose 56 sizes can be selected to limit conduit losses to about 5 kPa. The process air is supplied at a total pressure of 55 kPa (25+25+5), which is within the operating range of typical centrifugal or positive displacement blowers used in biological wastewater treatment.

Still referring to FIG. 4, a second hose 56 carries mixing/scouring air to the aerator 20. The air flow required for mixing ranges between 60-100 Nm³/h/cassette, with a preferred value of about 80 Nm³/h/cassette. Multiple cassettes 16 in a plant may be divided into mixing groups. Each mixing group may have, for example, from 4 to 24 cassettes 16. Each mixing group is equipped with one or more automatic valves 60. Preferably, the mixing air is provided at a constant rate but directed to the mixing groups in a cyclic or sequentially manner. For example, each mixing group may receive mixing air from 10-40 s, typically 20 s, every one to five minutes.

In one example, a plant has 24 units 40 with four cassettes 16 each for a total of 96 cassettes. Each unit 40 has an automatic valve 60. The units 40 are divided into six mixing groups, each mixing group having four units 40 and automatic valves 60 that open and close simultaneously. Each mixing group receives mixing air in turn for 20 seconds out of a total cycle time of 120 seconds. While a cassette 16 receives mixing air, the mixing air flow rate is 80 Nm³/h/cassette. The total mixing air flow rate is 80 Nm³/h/cassette×96/6, or 1,280 Nm³/h.

In another example, a plant has 24 units 40 with four cassettes 16 each for a total of 96 cassettes. There is one automatic valve 60 for every three units 40, or a total of eight automatic valves 60. The units 40 are divided into eight mixing groups, each mixing group having three units 40 and one automatic valve 60. Each mixing group receives mixing air in turn for 20 seconds out of a total cycle time of 160 seconds. While a cassette receives mixing air, the mixing air flow rate is 80 Nm³/h/cassette. The total mixing air flow rate is 80 Nm³/h/cassette×96/8, or 960 Nm³/h.

The air flow rate required for scouring ranges between 160-320 Nm³/h/cassette, with a preferred value of about 240 Nm³/h/cassette. The frequency for scouring may be, for example, 1-14 scours per week, with a preferred value of about 7 scours per week. If the number of automatic valves in a system is larger than the number of mixing groups, the flow rate used for mixing may be used for scouring. In the first example above, if only two automatic valves 60 are opened at the same time (rather than four), the scouring flow rate is 1280/2/4 or 160 Nm³/h/cassette. If only one valve is opened, the scouring flow rate is 1280/1/4 or 320 Nm³/h/cassette. In the second example, because there is only one automatic valve per mixing group, the blower is ramped up, or an additional blower is turned on, to achieve the desired scouring flow rate. To accommodate the scouring flow rate, a non-process air hose 56 for a four cassette unit 40 may be about 100 mm (4 inches) in diameter.

Figure 6:
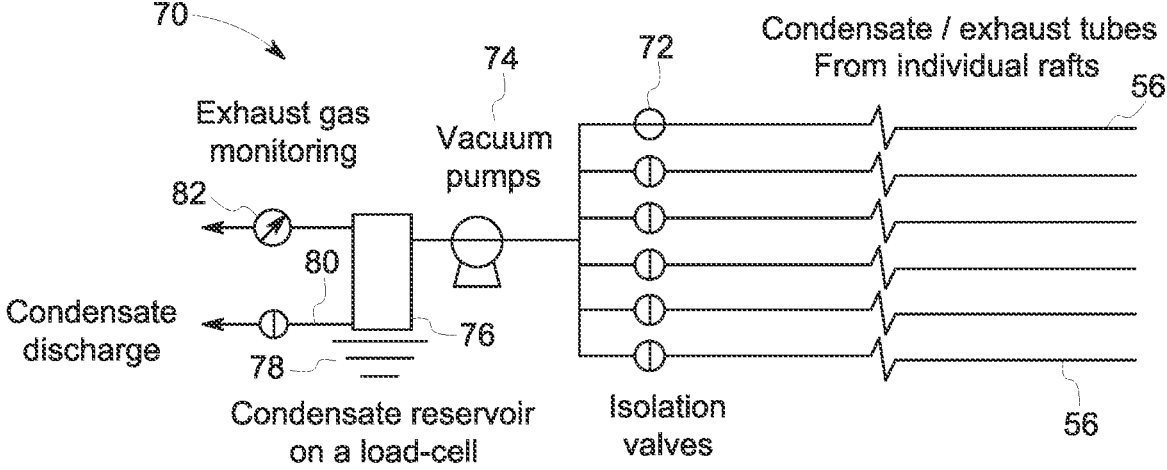
FIG. 6 shows a liquid removal and exhaust monitoring system for use with a membrane supported biofilm unit.

Another hose 56 may be used for one or more ancillary functions such as removing liquid from a module 10, monitoring gasses exhausted from the module 10, or both. This ancillary function hose 56 may be a small tube, for example about 5 mm for a four-cassette unit 40. In the example shown in FIG. 4, the ancillary hose 56 is connected at a low point, preferably at or below the bottom of the lower headers 14, where liquid from inside of the modules 10 collects. The liquid may contain condensate or leakage or both. The ancillary hose 56 may be attached to another hose 56, for example the process air hose 56, to extend from the unit 40 to the edge do the tank 52. The distal end of the ancillary hose 56 is connected to a monitoring station 70 shown in FIG. 6. The monitoring station 70 may be located on the ground or a deck near the tank 52 and be connected to ancillary hoses 56 from multiple units 40.

At the monitoring station 70, each ancillary hose 56 is equipped with a valve 72, for example an on/off isolation valve. The valve 72 allows liquid to be removed, or exhaust monitored, from each unit 40 separately. For example, each unit may be treated once per hour or once per day in sequence. The monitoring station 70 has a vacuum pump 74, a liquid reservoir 76 on a load cell 78 and a liquid discharge line 80.

When monitoring or testing a unit 40, the associated isolation valve 72 is opened (as shown for the top ancillary hose 56 in FIG. 6) while the other isolation valves 72 remain closed. Liquid is pumped from the unit 40 using the vacuum pump 74 and collected in the condensate reservoir 76. Once the mass of liquid removed has stabilized, indicating that substantially all the liquid has been removed from the unit 40, the mass is recorded using the load cell 78 and the condensate is discharged through discharge line 80. Alternatively, the liquid removed may be measured by a level sensor, or by another method. At or around the same time, the exhaust gas is monitored using one or more instruments 82 to determine the concentration of one or more gases, such as oxygen or carbon dioxide, that provide an indication of biological activity. When the testing for one unit 40 is done, its associated isolation valve 72 is closed and the process can be repeated for another unit 40. Typically, all of the units 40 are tested in sequence.

Liquid may collect in a unit 40 due to condensation of water vapor in the process air or due to leaks. The liquid is removed to allow for continued operation of the unit 40. Measuring the amount of liquid collected can be used, for example, to check for leaks in a unit. An expected amount of condensate can be calculated from data such as process air flow rate, relative humidity of process air, and the temperature of water in the tank 52. Comparing the amount of liquid collected to this estimate gives an indication of whether there are leaks and their significance. Alternatively, the amount of liquid removed over time can be monitored, optionally adjusted for seasonal or other factors, and used as a baseline. Significant departures from the baseline indicate a leak.

Exhaust gas monitoring can be used, for example, to determine the oxygen transfer rate of the unit 40. Using an appropriate calculation, for example using the difference in oxygen concentration between input process air and exhaust air and the process air flow rate, the rate of oxygen transferred through the unit 40 can be estimated. This rate gives an indication of the health of the biofilm and the rate of reaction in the biofilm. Although all of the exhaust air could be collected, it is more convenient to have an exhaust hose 56 extending from the lower header 14 to above the water around the module 10 without extending to the sides of the tank 52. Most of the exhaust air is simply vented, optionally through a restriction to cause the process air to be at higher pressure while in the module 10. Only a small amount of the exhaust air is required for exhaust gas monitoring, and this small amount can be withdrawn through the ancillary hose 56 to reduce the length of large diameter hose 56 required.

Figure 7:
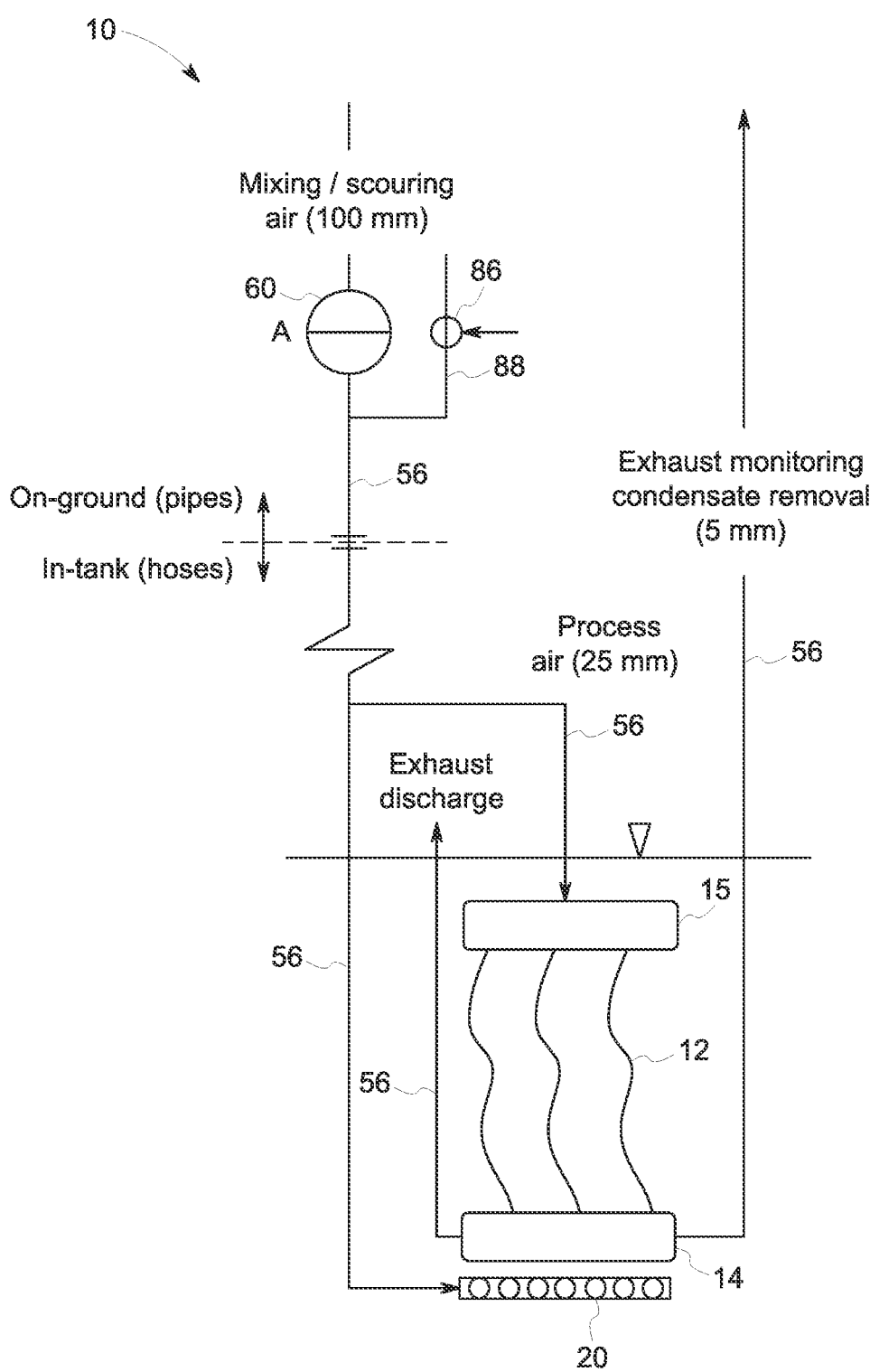
FIG. 7 shows a second example of piping connections to a membrane supported biofilm unit and aerator.

FIG. 7 shows an alternative arrangement of hoses 56 for a module. In this arrangement, each module 10 has only two hoses 56 running between the side of the tank 52 and the module 10. One hose 56 carries both process air and non-process air to the module 56. Example of sizes and flow rates given below are for a 4-cassette unit 40. The discussion above in relation to FIG. 4 also applies to this alternative arrangement to the extent that it is not inconsistent with the description below.

As shown in FIG. 7, process air and mixing/scouring air share the same hose 56 between the side of the tank 52 and the unit 40. At or near the unit 40, the hose 56 is split into two branches. One branch of the hose 56 extends to the aerators 20 below the modules 10. Another branch of the hose 56 extends to the upper headers 15 to provide process air to the modules 10. The split point to this branch is preferably above the water surface to prevent wastewater from accidentally entering into the process air if the hoses 56 are depressurised.

Figure 8:
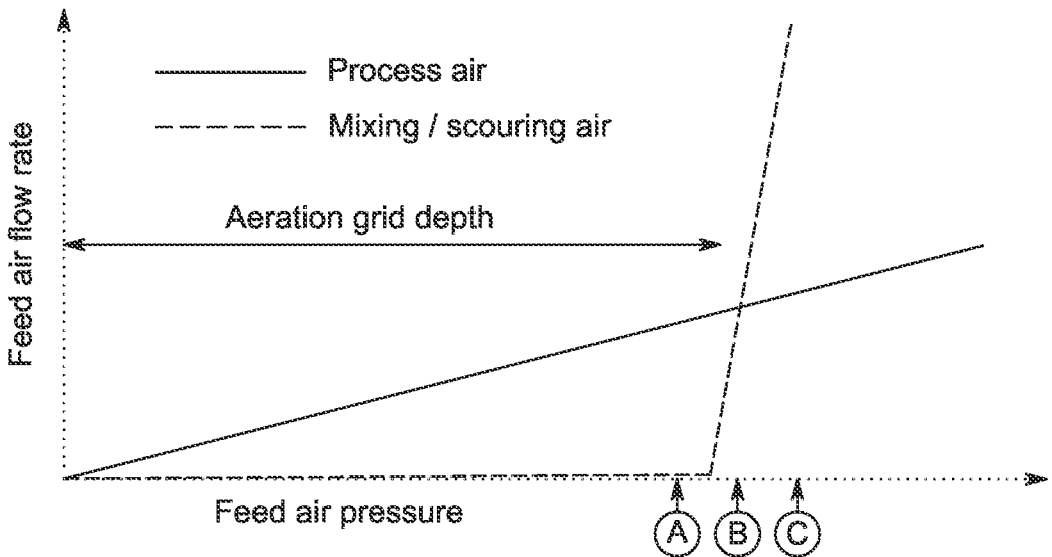
FIG. 8 is a graph showing feed air flow rate and feed air pressure for the example of FIG. 7.

Air supplied through the hose 56 flows either only to the modules 10 (process air) or both to the modules 10 and the aerators 20 depending on flow rate and pressure losses as illustrated in FIG. 8. The process air flow rate is generally linear and proportional to the air feed pressure, as dictated by the Hagen-Poisseulle relationship for laminar flow (solid line). The mixing/scouring air flow is zero until the feed pressure exceeds the submergence of the aeration grid (2.4 m or 24 kPa in FIGS. 7 and 8) and then increases sharply with very little pressure drop (broken line in FIG. 8). It is therefore possible to use all of the supplied air as process air by supplying air at a pressure that does not exceed the static water pressure at the depth of submergence of the aeration grid (Point A in FIG. 8). In this arrangement, it is preferably to have no orifice or other restriction creating a significant back pressure in the exhaust discharge hose 56. Based on FIG. 5, with an operating pressure of 25 kPa and no significant back pressure, the flow rate to each cassette 16 would be 10 Nm³/h for the small diameter hollow fiber and 18 Nm³/h for the large diameter hollow fiber, which is within the desirable range of 8-15 Nm3/h/cassette stated above. Increasing the applied pressure, for example to point B on FIG. 8, provides mixing air from the aerators 20. Increasing the applied pressure further, for example to point C on FIG. 8, provides scouring air from the aerators 20.

Mixing and scouring air flow rates and frequencies can be similar to those described in relation to FIG. 4. Mixing and scouring flows are obtained by operating the automatic valve 60 shown in FIG. 7. However, a by-pass line 88 around the automatic valve 60 provides a continuous flow of process air to the modules 10. The by-pass line 80 is preferably equipped with a pressure reducer 86, for example a needle valve that can be adjusted so that air flows through the membranes but does not flow to the aerators 20 when the automatic valve 60 is closed. The automatic valves 60 can be operated generally as described in relation to FIG. 4 to provide mixing and scouring air in sequence to multiple units 40. The ancillary hose 56 is connected to a monitoring station 70 as described above and the same processes are used to remove liquid and monitor exhaust gas.

Floating units 40 can be installed into existing tank 52 without interrupting operation of a plant or emptying the tank 52. Existing aeration diffusers and piping or other equipment in the tank 52 often does not need to be removed or relocated. The tethers 54 can be arranged to locate a unit 40 in a desired part of the tank 52, for example to improve mixing or biological conversion efficiency. If treatment objectives evolve over time, a unit 40 can be moved by reconfiguring or relocating its tethers 54. Optionally, a tank may have a set of tether attachment points available to allow a unit 40 to be relocated repeatedly, for example seasonally. The floating units 40 are generally self leveling which helps distribute process and non-process air equally among the modules. The aerators 20 are always under the same hydrostatic head despite changes in water level in the tank 52 so desired mixing and scouring air flow rates can be accurately achieved by controlled the applied gas pressure. Floating units 40 can be added, for example, to a suspended growth tank in a wastewater treatment plant. The suspended growth may be maintained under aerobic, anoxic or anaerobic conditions. In some circumstances, adding one or more floating units 40 might provide one or more advantages such as reducing energy consumption, accommodating a higher feed flow rate or pollutant loading, increasing nitrification capacity, increasing or implementing total nitrogen removal, or implementing biological phosphorous removal.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Numerical parameters given above are intended as non-limiting examples and might be increased or decreased, for example by 50% of a single value or the end points of a range.

We claim:

1. A process comprising the steps of,
immersing an assembly of gas transfer membranes in a liquid,
wherein the assembly of gas transfer membranes comprises a plurality of mixing groups;
supplying a process gas to the insides of the gas transfer membranes, whereby a component of the process gas supports a biochemical reaction in biofilms on the gas transfer membranes; and
supplying a non-process gas to a plurality of aerators in the liquid,
wherein at least one aerator is associated with each one of the mixing groups,
wherein the non-process gas is supplied sequentially to each of the plurality of aerators at one or more rates.

2. The process of claim 1 wherein the non-process gas is supplied sequentially to each of the plurality of aerators at a scouring rate.

3. The process of claim 1 wherein the non-process gas is supplied to each of the plurality of aerators sequentially at a rate that varies over time between no supply, supply at a mixing rate and supply at a scouring rate.

4. The process of claim 1 wherein the non-process gas is supplied to each mixing group through at least one valve associated with each mixing group.

5. The process of claim 1 wherein the non-process gas comprises membrane exhaust gas.

6. The process of claim 3 wherein the mixing rate is lower than the scouring rate.

7. The process of claim 1 wherein each mixing group has a plurality of aerators and a plurality of valves and wherein during some periods of time all of the plurality of valves are open and during other periods of time only some of the plurality of valves are opened.

8. The process of claim 7 wherein the plurality of aerators receive non-process gas at a mixing flow rate during the period of time when all of the valves are open and some of the aerators receive non-process gas at a scouring flow rate when only some of the plurality of valves are opened.

* * * * *